US012003862B2

(12) United States Patent
Grahsl et al.

(10) Patent No.: US 12,003,862 B2
(45) Date of Patent: Jun. 4, 2024

(54) CAMERA TIMESTAMP VALIDATION

(71) Applicant: Snap Inc., Santa Monica, CA (US)

(72) Inventors: Julian Grahsl, Vienna (AT); Alexander Kane, Vienna (AT)

(73) Assignee: Snap Inc., Santa Monica, CA (US)

( * ) Notice: Subject to any disclaimer, the term of this patent is extended or adjusted under 35 U.S.C. 154(b) by 85 days.

(21) Appl. No.: 17/845,478

(22) Filed: Jun. 21, 2022

(65) Prior Publication Data

US 2023/0412928 A1 Dec. 21, 2023

(51) Int. Cl.
*H04N 23/72* (2023.01)
*H04N 13/111* (2018.01)
*H04N 13/243* (2018.01)

(52) U.S. Cl.
CPC .......... *H04N 23/72* (2023.01); *H04N 13/111* (2018.05); *H04N 13/243* (2018.05); *H04N 2213/008* (2013.01)

(58) Field of Classification Search
CPC .... H04N 23/72; H04N 13/111; H04N 13/243; H04N 2213/008; H04N 23/60; H04N 23/665; H04N 23/74; H04N 23/56; G02B 2027/0138; G02B 2027/014; G02B 27/0172; G06F 1/14
See application file for complete search history.

(56) References Cited

U.S. PATENT DOCUMENTS

| 11,778,129 | B1 * | 10/2023 | Abbe | H04N 23/90 348/207.99 |
| 2017/0324949 | A1 * | 11/2017 | Chen | H04N 13/239 |
| 2019/0387218 | A1 * | 12/2019 | Trail | H04N 13/344 |
| 2020/0099824 | A1 * | 3/2020 | Benemann | G06T 7/521 |
| 2021/0400182 | A1 * | 12/2021 | Eagleston | H04N 23/80 |
| 2021/0409678 | A1 | 12/2021 | Birklbauer et al. | |
| 2022/0172511 | A1 * | 6/2022 | He | H04N 23/56 |
| 2022/0310037 | A1 * | 9/2022 | Osmanis | G02B 27/0093 |
| 2023/0403385 | A1 * | 12/2023 | Price | H04N 5/33 |

FOREIGN PATENT DOCUMENTS

| WO | WO-2004008742 A2 * | 1/2004 | H04N 23/56 |
| WO | WO-2022245344 A1 * | 11/2022 | |

OTHER PUBLICATIONS

"International Application Serial No. PCT/US2023/068172, International Search Report dated Sep. 25, 2023", 4 pgs.

(Continued)

*Primary Examiner* — Padma Haliyur

(74) *Attorney, Agent, or Firm* — Schwegman Lundberg & Woessner, P.A.

(57) ABSTRACT

A method of determining an image capture timestamp offset or error includes generating optical flashes at an optical flash rate. A set of images of the optical flashes are captured at an image capture rate. The image capture rate is different from the optical flash rate, and each image includes an associated image timestamp. Signals associated with the generation of the optical flashes are also timestamped. The intensity of each image in the set of images is determined, and the image having the greatest intensity in the set of images is identified. The timestamp offset or error is determined as the difference between the timestamp of the image having the greatest intensity and the timestamp of the corresponding optical flash.

20 Claims, 13 Drawing Sheets

(56) References Cited

OTHER PUBLICATIONS

"International Application Serial No. PCT/US2023/068172, Written Opinion dated Sep. 25, 2023", 6 pgs.
Sa, Inkyu, et al., "Outdoor Flight Testing of a Pole Inspection UAV Incorporating High-speed Vision: Results of the 9th International Conference", In: "Field and Service Robotics: Results of the 9th International Conference", Springer International Publishing, Cham, [Online]. Retrieved from the Internet: <https://core.ac.uk/download/pdf/19965857.pdf>, (Jan. 1, 2015), 14 pgs.
Sommer, Hannes, et al., "A Low-Cost System for High-Rate, High-Accuracy Temporal Calibration for LIDARs and Cameras", 2017 IEEE/RSJ International Conference On Intelligent Robots And Systems (IROS), (Sep. 24, 2017), 2219-2226.

\* cited by examiner

US 12,003,862 B2

CAMERA TIMESTAMP VALIDATION

TECHNICAL FIELD

The present disclosure relates generally to image capture devices and more particularly, but not exclusively, to image capture devices used for augmented reality.

BACKGROUND

Augmented reality (AR) devices permit a user to view the surrounding environment (the "real world"), and to also see objects (e.g., virtual objects such as 3D renderings, images, video, text, and so forth) that are generated for display to appear as a part of, and/or overlaid upon, the surrounding environment. In some examples, AR devices take the form of glasses with displays through which a user can see the real world, and onto which virtual objects can be displayed. In other examples, an AR device can take the form of a smartphone or tablet. In such a case, a video feed of the real world, captured by a camera in the smartphone or tablet, is displayed on the smartphone or tablet's display, with AR object or effects included in or applied to the video feed of the real world.

An AR device depends on accurate timing information from one or more associated cameras to ensure accurate tracking of the AR device as it moves, and to ensure correct placement of AR objects and effects.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
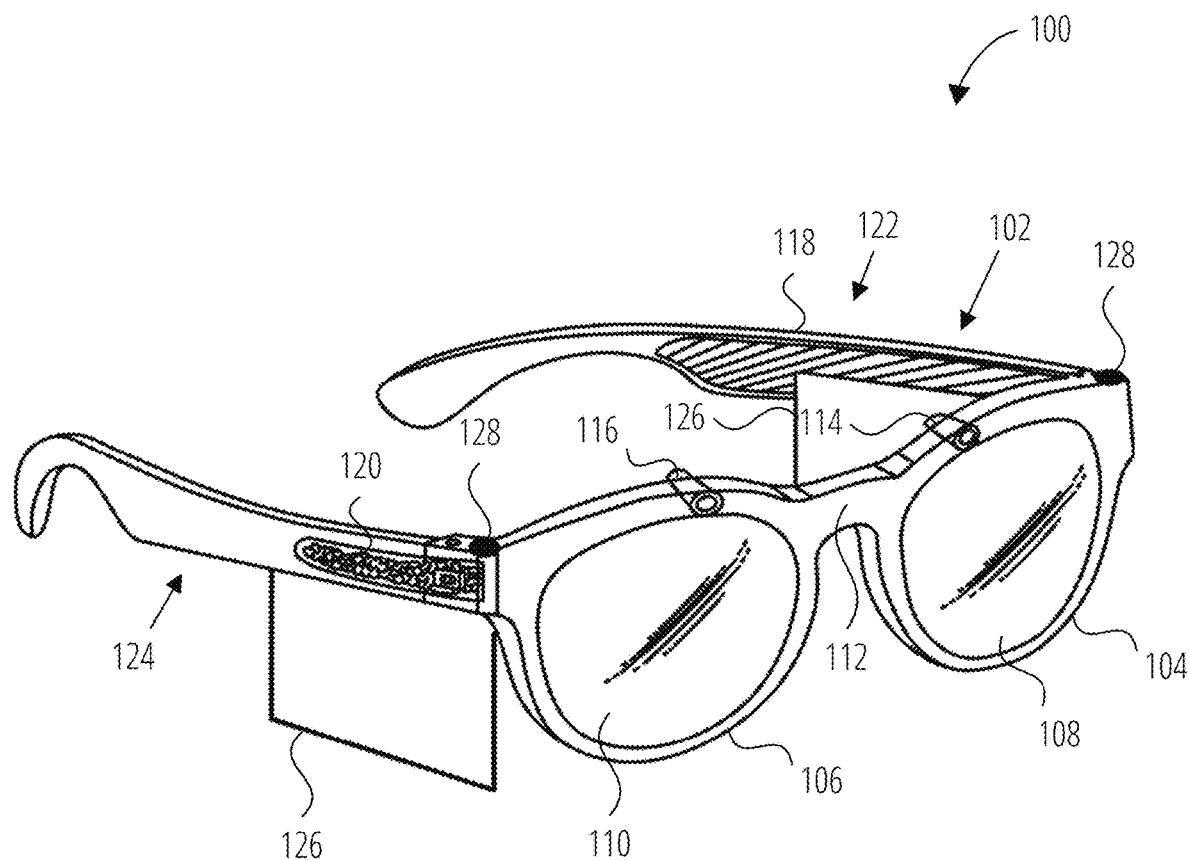
FIG. 1 is a perspective view of a head-worn device, in accordance with some examples.

Some head-worn AR devices, such as AR glasses, include a transparent or semi-transparent display that enables a user to see through the transparent or semi-transparent display to view the surrounding environment. Additional information or objects (e.g., virtual objects such as 3D renderings, images, video, text, and so forth) are shown on the display and appear as a part of, and/or overlaid upon, the surrounding environment to provide an augmented reality (AR) experience for the user. The display may for example include a waveguide that receives a light beam from a projector, but any appropriate display for presenting augmented or virtual content to the wearer may be used.

The correct positioning of virtual objects and other AR effects, and synchronization of their movement or updates with what is occurring in the real world, depends on accurate timing information received from the camera that is used to capture images or a video feed of the real world. The captured images are typically used by the AR device for characterizing the real world, such as device localization and tracking that utilizes image processing techniques. The accuracy of the timing of the image capture is relative to other events occurring in the AR device, such that two different events occurring at the same moment will have the same timestamp assigned by the AR device.

To determine an offset or error in the timestamping of images capture by camera, a set of timestamped images of optical flashes are captured at an image capture rate. The image capture rate is different from the optical flash rate. Signals associated with the generation of the optical flashes are also timestamped. The intensity of each image in the set of images is determined, and the image having the greatest intensity in the set of images is identified. The timestamp offset or error of the camera is determined as the difference between the timestamp of the real or theoretical image having the greatest intensity, and the timestamp of the corresponding optical flash.

The timestamp offset can then be used to adjust the camera timestamping so that image timestamps coincide more accurately with other timestamps generated by the AR device. This provides improved alignment and synchronization of visual content with real world objects.

In some examples, provided is a computer-implemented method of determining an image capture timestamp offset, including generating a plurality of optical flashes at an optical flash rate, capturing a set of images of the plurality of optical flashes at an image capture rate, the image capture rate being different from the optical flash rate, and each image of an optical flash including an associated image timestamp, timestamping signals associated with generation of the plurality of optical flashes, determining an intensity of each image in the set of images, determining an image having the greatest intensity in the set of images, and determining a difference between a timestamp of the image having the greatest intensity and the timestamp of a corresponding optical flash to generate an image capture timestamp offset. An optical flash duration may be approximately equal to an image exposure duration.

The method may further include determining a first line from the intensities and timestamps of images in the set of images that precede the image having the greatest intensity in the set of images, determining a second line from the intensities and timestamps of images in the set of images that follow the image having the greatest intensity in the set of images, determining an intersection of the first line and the second line, and using a time value of the intersection of the first line and the second line as the timestamp of an image having the greatest intensity in the determination of the difference between the timestamp of the image having the greatest intensity and the timestamp of the corresponding optical flash.

The signals associated with generation of the optical flashes may be received at a port of a computer processor associated with a camera that captures the set of images of the optical flashes, the computer processor timestamping the receipt of the signals associated with generation of the optical flashes.

The method may further include setting a timer having a duration that is sufficient to ensure capture of an image having a maximum intensity, and capturing the set of images of the optical flashes for the duration of the timer. The image intensity of each image may be an average image intensity.

The method may further include adjusting a camera timestamping parameter based on the image capture timestamp offset.

In some examples, provided is a non-transitory computer-readable storage medium, the computer-readable storage medium including instructions that when executed by a computer, cause the computer to perform operations for determining an image capture timestamp offset from optical flashes generated at an optical flash rate according to any of the methods and limitations described above, including but not limited to the operations including generating a plurality of optical flashes at an optical flash rate, capturing a set of images of the plurality of optical flashes at an image capture rate, the image capture rate being different from the optical flash rate, and each image of an optical flash including an associated image timestamp, timestamping signals associated with generation of the plurality of optical flashes, determining an intensity of each image in the set of images, determining an image having the greatest intensity in the set of images, and determining a difference between a timestamp of the image having the greatest intensity and the timestamp of a corresponding optical flash to generate an image capture timestamp offset.

In some examples, provided is a computing apparatus includes a processor and a memory storing instructions that, when executed by the processor, configure the apparatus to perform operations for determining an image capture timestamp offset from optical flashes generated at an optical flash rate according to any of the methods and limitations described above, including but not limited to the operations including generating a plurality of optical flashes at an optical flash rate, capturing a set of images of the plurality of optical flashes at an image capture rate, the image capture rate being different from the optical flash rate, and each image of an optical flash including an associated image timestamp, timestamping signals associated with generation of the plurality of optical flashes, determining an intensity of each image in the set of images, determining an image having the greatest intensity in the set of images, and determining a difference between a timestamp of the image having the greatest intensity and the timestamp of a corresponding optical flash to generate an image capture timestamp offset.

FIG. 1 is a perspective view of a head-worn AR device (e.g., glasses 100), in accordance with some examples. The glasses 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112.

A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the glasses 100.

The frame 102 additionally includes a left arm or temple piece 122 and a right arm or temple piece 124. In some examples the frame 102 can be formed from a single piece of material so as to have a unitary or integral construction.

The glasses 100 can include a computing device, such as a computer 120, which can be of any suitable type so as to be carried by the frame 102 and, in one or more examples, of a suitable size and shape so as to be partially disposed in one of the temple piece 122 or the temple piece 124. The computer 120 can include one or more processors with memory, wireless communication circuitry, and a power source. As discussed below, the computer 120 comprises low-power circuitry, high-speed circuitry, and a display processor. Various other examples may include these elements in different configurations or integrated together in different ways. Additional details of aspects of computer 120 may be implemented as illustrated by the data processor 202 discussed below.

The computer 120 additionally includes a battery 118 or other suitable portable power supply. In some examples, the battery 118 is disposed in left temple piece 122 and is electrically coupled to the computer 120 disposed in the right temple piece 124. The glasses 100 can include a connector or port (not shown) suitable for charging the battery 118, a wireless receiver, transmitter or transceiver (not shown), or a combination of such devices.

The glasses 100 include a first or left camera 114 and a second or right camera 116. Although two cameras are depicted, other examples contemplate the use of a single or additional (i.e., more than two) cameras. In one or more examples, the glasses 100 include any number of input sensors or other input/output devices in addition to the left camera 114 and the right camera 116. Such sensors or input/output devices can additionally include biometric sensors, location sensors, motion sensors, and so forth.

In some examples, the left camera 114 and the right camera 116 provide video frame data for use by the glasses 100 to extract 3D information from a real world scene.

The glasses 100 may also include a touchpad 126 mounted to or integrated with one or both of the left temple piece 122 and right temple piece 124. The touchpad 126 is generally vertically-arranged, approximately parallel to a user's temple in some examples. As used herein, generally vertically aligned means that the touchpad is more vertical than horizontal, although potentially more vertical than that. Additional user input may be provided by one or more buttons 128, which in the illustrated examples are provided on the outer upper edges of the left optical element holder 104 and right optical element holder 106. The one or more touchpads 126 and buttons 128 provide a means whereby the glasses 100 can receive input from a user of the glasses 100.

In use, a user of the glasses 100 will be presented with information, content and various 3D user interfaces on near eye displays in the left optical element 108 and/or the right optical element 110. The user can then interact with the glasses 100 using a touchpad 126 and/or the buttons 128, voice inputs or touch inputs on an associated device (e.g., user device 228 illustrated in FIG. 2), and/or hand movements, locations, and positions detected by the glasses 100.

Figure 2:
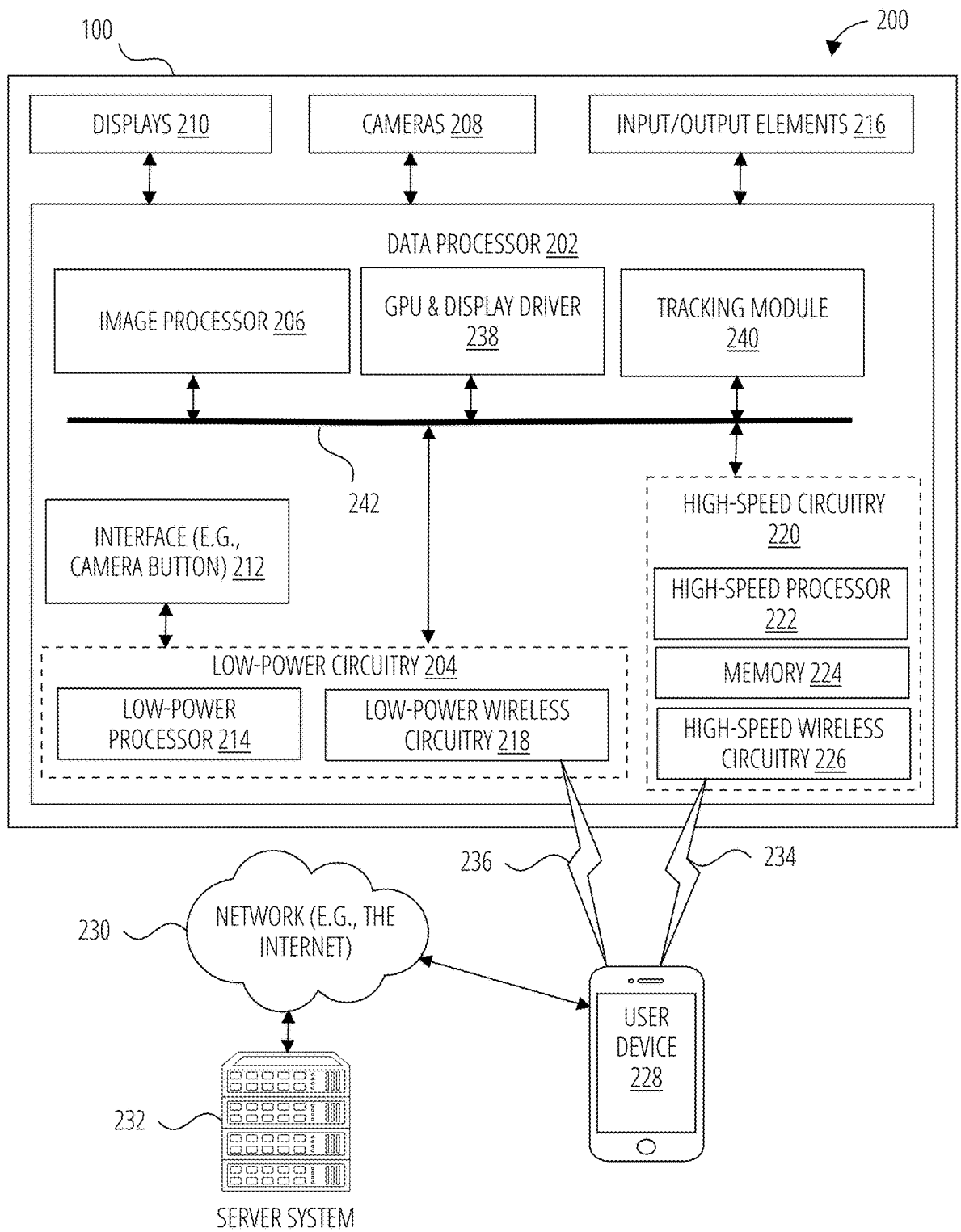
FIG. 2 is a block diagram illustrating a networked system 200 including details of the head-worn device of FIG. 1, in accordance with some examples.

FIG. 2 is a block diagram illustrating a networked system 200 including details of the glasses 100, in accordance with some examples. The networked system 200 includes the glasses 100, a user device 228, and a server system 232. The user device 228 may be a smartphone, tablet, phablet, laptop computer, access point, or any other such device capable of connecting with the glasses 100 using a low-power wireless connection 236 and/or a high-speed wireless connection 234. The user device 228 is connected to the server system 232 via the network 230. The network 230 may include any combination of wired and wireless connections. The server system 232 may be one or more computing devices as part of a service or network computing system. The user device 228 and any elements of the server system 232 and network 230 may be implemented using details of the software architecture 1204 or the machine 1300 described in FIG. 12 and FIG. 13 respectively.

The glasses 100 include a data processor 202, displays 210, one or more camera 208, and additional input/output elements 216. The input/output elements 216 may include microphones, audio speakers, biometric sensors, additional sensors, or additional display elements integrated with the data processor 202. Examples of the input/output elements 216 are discussed further with respect to FIG. 12 and FIG. 13. For example, the input/output elements 216 may include any of I/O components 1306 including output components 1328, motion components 1336, and so forth. In the particular examples described herein, the displays 210 include a display for each of the user's left and right eyes.

The data processor 202 includes an image processor 206 (e.g., a video processor), a GPU & display driver 238, a tracking module 240, an interface 212, low-power circuitry 204, and high-speed circuitry 220. The components of the data processor 202 are interconnected by a bus 242.

The interface 212 refers to any source of a user command that is provided to the data processor 202. In one or more examples, the interface 212 is a physical button that, when depressed, sends a user input signal from the interface 212 to a low-power processor 214. A depression of such button followed by an immediate release may be processed by the low-power processor 214 as a request to capture a single image, or vice versa. A depression of such a button for a first period of time may be processed by the low-power processor 214 as a request to capture video data while the button is depressed, and to cease video capture when the button is released, with the video captured while the button was depressed stored as a single video file. Alternatively, depression of a button for an extended period of time may capture a still image. In some examples, the interface 212 may be any mechanical switch or physical interface capable of accepting user inputs associated with a request for data from the camera 208. In other examples, the interface 212 may have a software component, or may be associated with a command received wirelessly from another source, such as from the user device 228.

The image processor 206 includes circuitry to receive signals from the camera 208 and process those signals from the camera 208 into a format suitable for storage in the memory 224 or for transmission to the user device 228. In one or more examples, the image processor 206 (e.g., video processor) comprises a microprocessor integrated circuit (IC) customized for processing sensor data from the camera 208, along with volatile memory used by the microprocessor in operation.

The low-power circuitry 204 includes the low-power processor 214 and the low-power wireless circuitry 218. These elements of the low-power circuitry 204 may be implemented as separate elements or may be implemented on a single IC as part of a system on a single chip. The low-power processor 214 includes logic for managing the other elements of the glasses 100. As described above, for example, the low-power processor 214 may accept user input signals from the interface 212. The low-power processor 214 may also be configured to receive input signals or instruction communications from the user device 228 via the low-power wireless connection 236. The low-power wireless circuitry 218 includes circuit elements for implementing a low-power wireless communication system. Bluetooth™ Smart, also known as Bluetooth™ low energy, is one standard implementation of a low power wireless communication system that may be used to implement the low-power wireless circuitry 218. In other examples, other low power communication systems may be used.

The high-speed circuitry 220 includes a high-speed processor 222, a memory 224, and a high-speed wireless circuitry 226. The high-speed processor 222 may be any processor capable of managing high-speed communications and operation of any general computing system used for the data processor 202. The high-speed processor 222 includes processing resources used for managing high-speed data transfers on the high-speed wireless connection 234 using the high-speed wireless circuitry 226. In some examples, the high-speed processor 222 executes an operating system such as a LINUX operating system or other such operating system such as the operating system 1212 of FIG. 12. In addition to any other responsibilities, the high-speed processor 222 executing a software architecture for the data processor 202 is used to manage data transfers with the high-speed wireless circuitry 226. In some examples, the high-speed wireless circuitry 226 is configured to implement Institute of Electrical and Electronic Engineers (IEEE) 802.11 communication standards, also referred to herein as Wi-Fi. In other examples, other high-speed communications standards may be implemented by the high-speed wireless circuitry 226.

The memory 224 includes any storage device capable of storing camera data generated by the camera 208 and the image processor 206. While the memory 224 is shown as integrated with the high-speed circuitry 220, in other examples, the memory 224 may be an independent stand-alone element of the data processor 202. In some such examples, electrical routing lines may provide a connection through a chip that includes the high-speed processor 222 from image processor 206 or the low-power processor 214 to the memory 224. In other examples, the high-speed processor 222 may manage addressing of the memory 224 such that the low-power processor 214 will boot the high-speed processor 222 any time that a read or write operation involving the memory 224 is desired.

The tracking module 240 estimates the position and orientation (the "pose") of the glasses 100. For example, the tracking module 240 uses image data and corresponding inertial data from the camera 208 and the position components 1340, as well as GPS data, to track a location and determine a pose of the glasses 100 relative to a frame of reference (e.g., real-world environment). The tracking module 240 continually gathers and uses updated sensor data describing movements of the glasses 100 to determine updated three-dimensional poses of the glasses 100 that indicate changes in the relative position and orientation relative to physical objects in the real-world environment. The tracking module 240 permits visual placement of virtual objects relative to physical objects by the glasses 100 within the field of view of the user via the displays 210.

The GPU & display driver 238 may use the pose of the glasses 100 to generate frames of virtual content or other content to be presented on the displays 210 when the glasses 100 are functioning in a traditional augmented reality mode. In this mode, the GPU & display driver 238 generates updated frames of virtual content based on updated three-dimensional poses of the glasses 100, which reflect changes in the position and orientation of the user in relation to physical objects in the user's real-world environment.

One or more functions or operations described herein may also be performed in an application resident on the glasses 100 or on the user device 228, or on a remote server. For example, one or more functions or operations described herein may be performed by one of the applications 1206 such as messaging application 1246.

Figure 3:
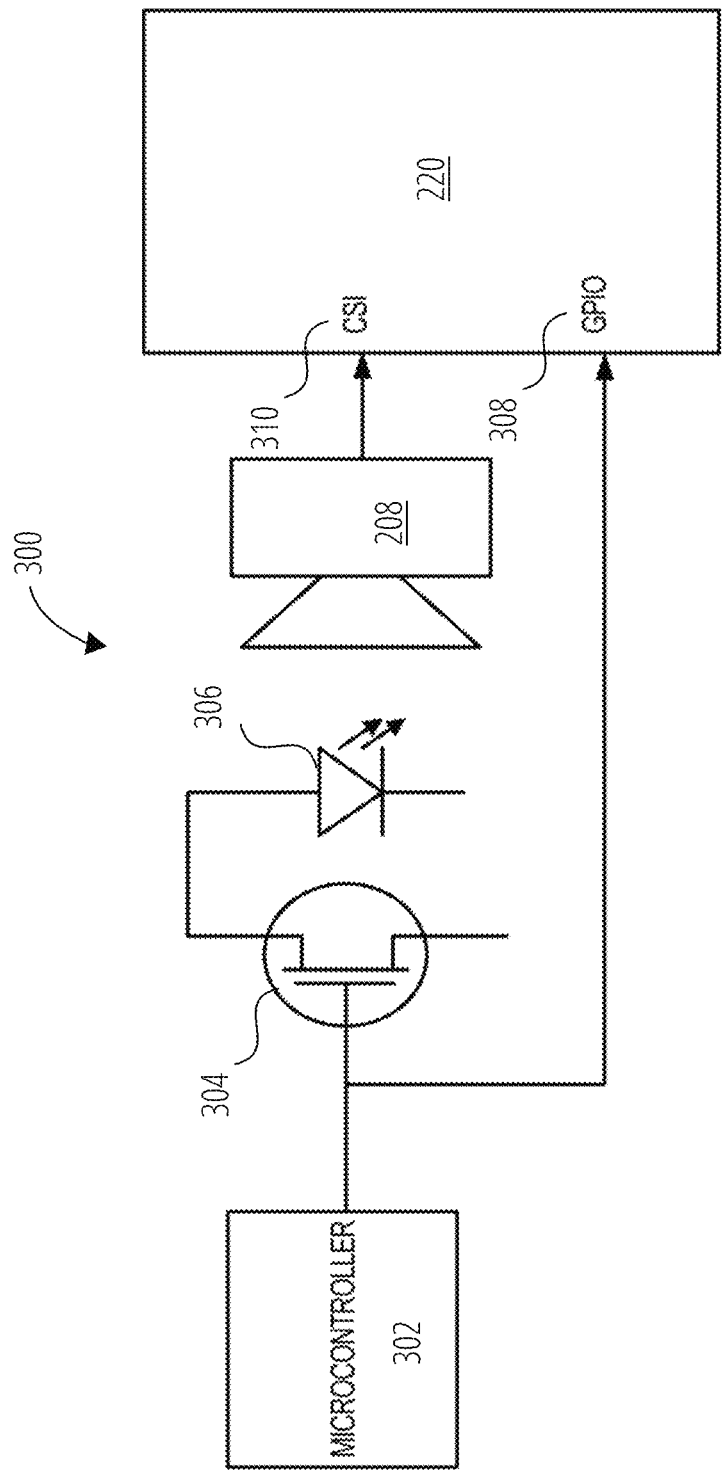
FIG. 3 is a schematic diagram illustrating a system used to perform camera timestamp validation, or camera timestamp offset, according to some examples.

FIG. 3 is a schematic diagram illustrating a system 300 used to perform camera timestamp validation, or camera timestamp offset, according to some examples. The system includes a microcontroller 302, a transistor 304 (such as a metal-oxide-semiconductor field-effect transistor), a light-emitting diode (LED 306), as well as a camera 208 and high-speed circuitry 220 that form part of an AR device such as glasses 100 or user device 228. FIG. 3 is a conceptual diagram not intended to illustrate a literal circuit.

The microcontroller 302 provides an on/off signal that provides/cuts power to the LED 306 via the transistor 304. The on/off signal is simultaneously provided to a general-purpose input/output port 308 in the high-speed circuitry 220, where its "on" arrival is timestamped to give an accurate measurement of the time of activation of the LED 306. Frames from the camera 208, timestamped by the camera 208 are provided to the high-speed circuitry 220 via a camera serial interface 310. Timestamps are generated by a processor that processes the camera images.

The high-speed circuitry 220 includes an application with program instructions that, when executed, capture the timestamp generated upon the arrival of the signal from the microcontroller 302 at the port 308, and that capture the corresponding image of the flash of the LED 306 with the camera 208. The image of the flash will include a camera timestamp. A sequence of images and timestamps will be captured and saved to memory 224. Additional program instructions may be included in the high-speed circuitry 220 to fully or partially analyze the set of images and data, or the set of images and data may be uploaded for analysis locally (such as on the user device 228 or another local computing device), or remotely for analysis at the server system 232. The program instructions will perform the methods described below with reference to FIG. 7.

The microcontroller 302 also includes program instructions that instruct the microcontroller 302 to provide a periodic signal to flash the LED 306 as discussed below. The period of the signal is adjustable.

In use, the camera 208 is set to a fixed exposure and the LED 306 is flashed by the microcontroller 302 for a duration that is approximately equal to the image exposure time, but at a frequency of flashing that is slightly different from the camera frame rate. When a flash of the LED 306 is perfectly in phase with the camera exposure then the average intensity of the image captured by the camera 208 will be at its maximum, and the timestamps for the corresponding image and as generated upon receipt of the signal at the port 308 should be identical. By capturing a stream of images and identifying the brightest one, and comparing the general-purpose input/output (GPIO) generated LED timestamp with the camera timestamp, any error in the camera timestamp can be determined, as discussed in more detail below.

The measurement of the intensity of a single global optical flash on a full image is done for the sake of simplicity in implementation. A more general approach could direct any number of optical flashes (possibly with a known temporal spread) to specific regions on the image sensor surface to achieve the same result and/or to increase the robustness of the measurement process. An optical flash could come from a laser diode or other light source as well.

Whether the image data captured by the camera 208 is stored as a video or individual images is a matter of encoding. The camera 208 can generate either an image stream (output images at a constant frequency) or provide repeated on-demand image captures. Either can be used in the methods described herein, but an image stream is more convenient.

The most information is obtained from the image data if the exposure time is half the duration of the frame period (the inverse of the frame rate). If the exposure time is more than half of the frame period then the top of the average intensity plot becomes flattened, and if the exposure time is less than half of the frame period then the troughs of the average intensity plot become flattened. To get the best data, the exposure is preferably balanced with the gain on the image sensor to ensure that the maximum average intensity is as bright as possible, while avoiding oversaturated pixels. Exposure duration shouldn't lead to oversaturation, but preferably should be close to half the frame rate. Such optimizations improve the quality of the data, but if sufficient data is captured it should be possible to eliminate any errors due to deviation from the ideal conditions.

All other things being equal, the faster the frame rate the quicker all of the required data can be captured, but in practice this isn't a significant concern. The frame rate also depends upon the frame rate that the camera is capable of at the resolution requested, which for the purposes herein doesn't require a high resolution.

Figure 4:
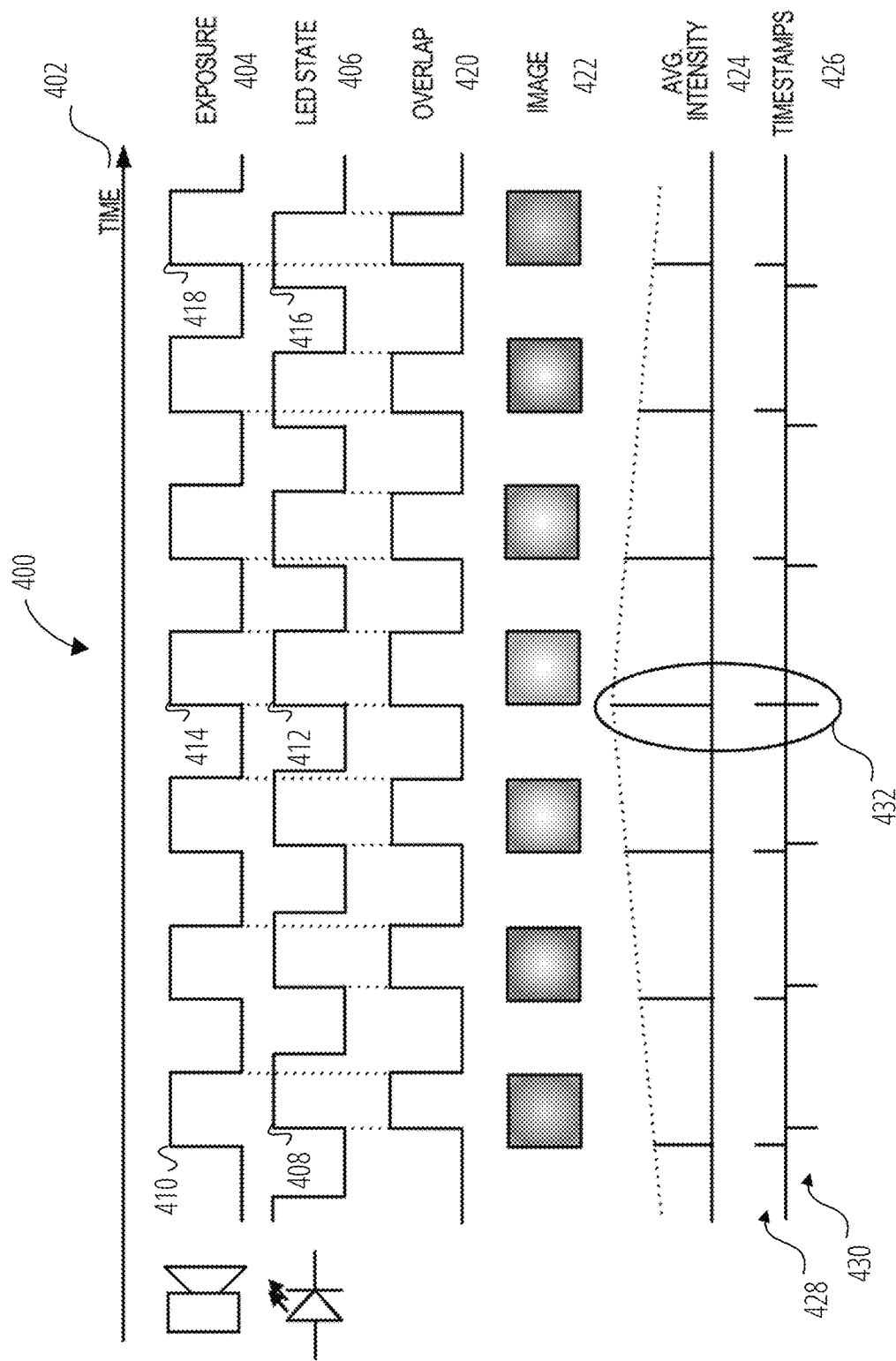
FIG. 4 is a chart illustrating the sequence of events in operation of the system of FIG. 3, according to some examples.

FIG. 4 is a chart 400 illustrating the sequence of events in operation of the system 300 of FIG. 3. The chart shows the passage of time 402 from left to right in the figure, and the associated LED flashes (corresponding to LED "on" states), exposures, timestamps, and so forth.

As can be seen from the figure, the camera exposures 404 and the "on" LED states 406 have approximately the same duration, but the start of each LED "on" state occurs at a frequency that is slightly less than the camera exposure frequency. As such, the LED states 406 advance from initially starting slightly after the start of a corresponding camera exposure (LED start 408 and exposure start 410), to coinciding with the start of the corresponding camera exposure (LED start 412 and exposure start 414), to preceding the start of the camera exposure (LED start 416 and exposure start 418).

The amount of the overlap 420 between the two states, corresponding to the time during which the camera 208 is capturing light emitted by the LED 306, thus increases to a peak and then decreases. The average intensity 424 thus also increases to a peak of greatest average intensity 432, which represents the image frame for which the time of exposure most closely matches the time of the "on" state of the LED. The corresponding timestamps 426 are shown at the bottom of the chart, with the camera timestamps 428 shown above the corresponding GPIO timestamps 430. Assuming that the camera timestamp represents the start of the exposure period, the timestamps at the greatest average intensity 432 should be equal.

Figure 5:
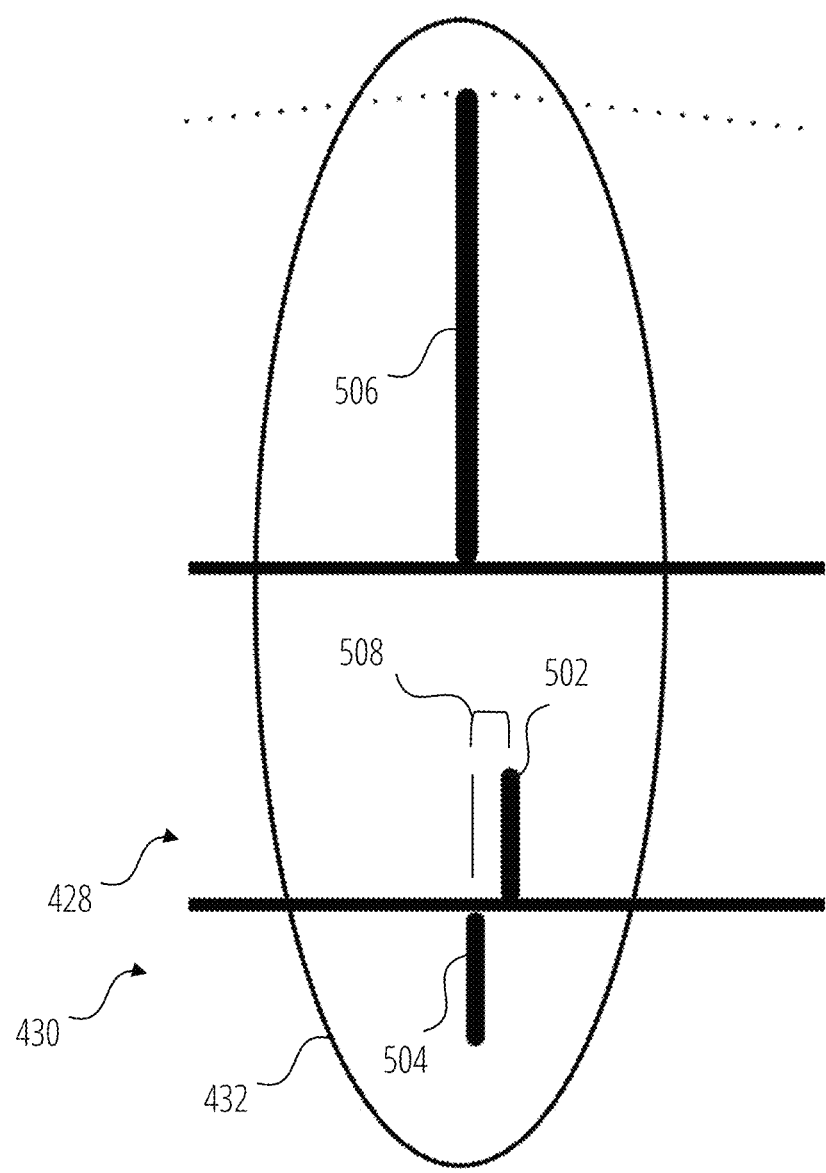
FIG. 5 is an enlarged version of the greatest average intensity region illustrated in FIG. 4.

FIG. 5 is an enlarged version of the greatest average intensity 432 region illustrated in FIG. 4, to illustrate an offset or error between a particular LED timestamp 504 and a particular camera timestamp 502, corresponding to a particular maximum intensity 506. As can be seen, there is a difference 508 between the particular camera timestamp 502 and the particular LED timestamp 504, indicating that the particular LED timestamp 504 precedes the particular camera timestamp 502. The magnitude of the difference can be obtained by subtracting the one timestamp from the other, with the sign of the difference indicating whether or not the one timestamp precedes or follows the other. This difference can then be used to adjust the timestamp function of the camera to advance or retard the camera timestamps as needed, so that the camera and LED timestamps match. This can be done as part of a calibration procedure.

Figure 6:
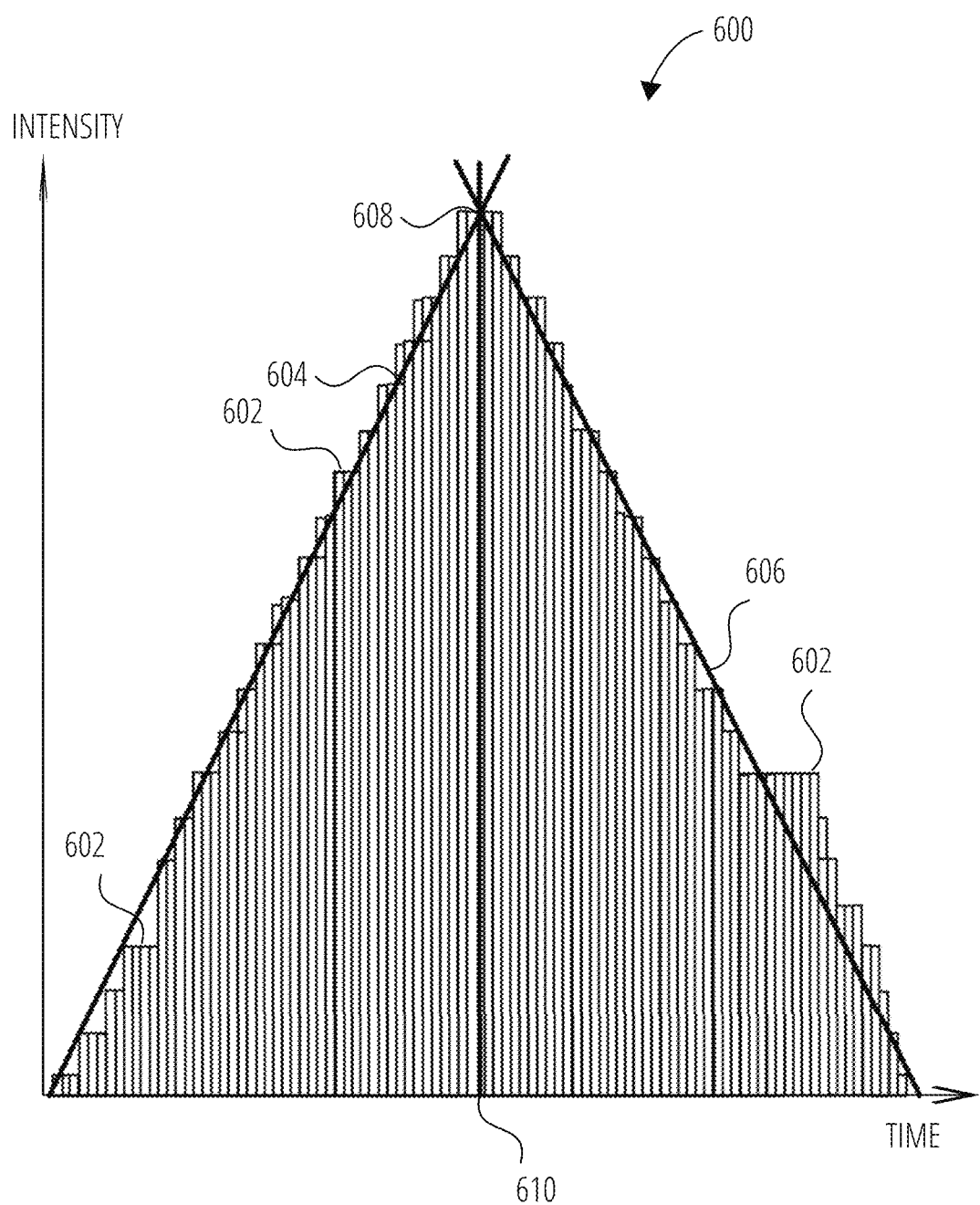
FIG. 6 is a chart showing sequential average intensity values for images captured by the camera, according to some examples.

FIG. 6 is a chart 600 showing sequential average intensity values 602 for images captured by the camera 208. As expected, the average intensity values 602 increase to a peak and then decrease from the peak, as the LED flashes align and then become misaligned with the camera exposure periods. As can be seen from the chart 600, the increase and decrease in the average intensities is not perfectly linear, and the exact position of the maximum average intensity has some uncertainty due to the width or time taken by the exposure and the closeness in value of the two greatest average intensities at the peak. There is no guarantee that there is going to be a single camera exposure that aligns perfectly with an LED flash.

To improve the timestamp as recorded by the camera 208, a first line 604 is fitted to the increasing average intensity values 602 and a second line 606 is fitted to the decreasing average intensity values 602. The sets of values used to determine lines 604 and 606 may include a common maximum intensity value if one is present. The intersection 608 of the first line 604 and second line 606 is determined. The value on the time axis of the intersection 608 provides a calculated timestamp 610 that is likely to be more accurate than a camera timestamp for a peak average intensity value. The calculated timestamp 610 is thus used as the timestamp for the theoretical image having the maximum average intensity, that is, a theoretical image best aligned with an LED flash.

Figure 7:
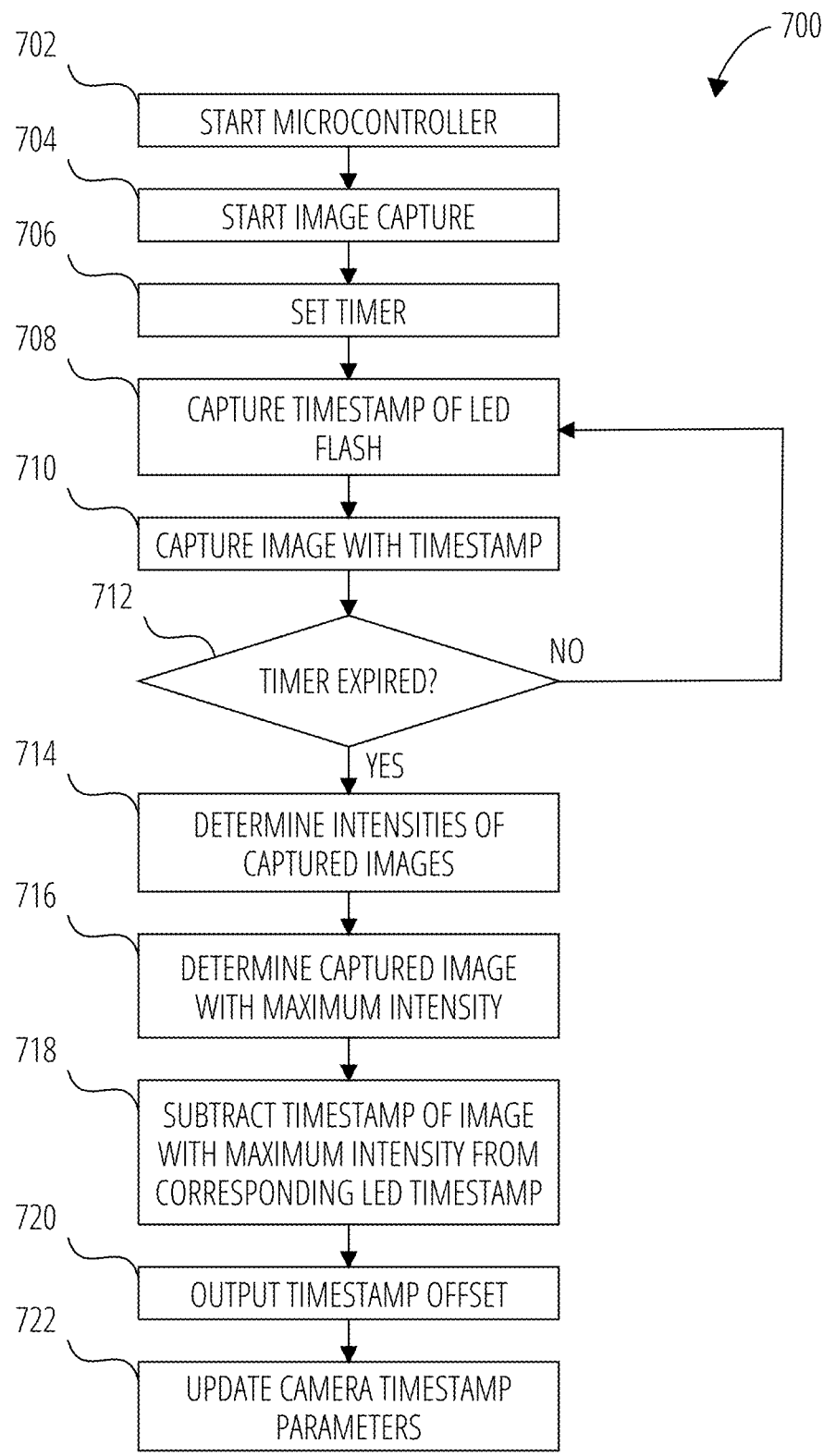
FIG. 7 is a flowchart illustrating a method of determining an error or offset in a camera timestamp, according to some examples.

FIG. 7 is a flowchart 700 illustrating a method of determining an error or offset in a camera timestamp, according to some examples. For explanatory purposes, the operations of the flowchart 700 are described herein as occurring in serial, or linearly. However, multiple operations of the flowchart 700 may occur in parallel. In addition, the operations of the flowchart 700 need not be performed in the order shown and/or one or more blocks of the flowchart 700 need not be performed and/or can be replaced by other operations.

Operations illustrated in FIG. 7 will typically execute on the glasses 100. In other examples, the operations are performed jointly between an application running on the user device 228 and the data processor 202 and associated hardware in or associated with the glasses 100. Various implementations are of course possible, with some of the operations taking place in server system 232, or with one application calling another application or SDK for required functionality.

The method commences at operation 702, in which the microcontroller 302 starts running instructions to provide periodic LED flashes of approximately the duration of the camera exposure time as described above. In operation 704, the high-speed circuitry 220 starts running instructions to provide periodic image capture by the camera 208 with a particular exposure time as described above.

In operation 706, the data processor 202 sets a timer for image capture. The duration of the timer is at least long enough to ensure that there will be one complete overlap of LED flashes and an exposure time period, so that at least one peak will be captured. If the gap between exposures is approximately the same duration as the exposure times, and the LED flash has approximately the same duration as the exposure time "E," but the gap between LED flashes is shorter than the gap between exposures by time "T," then a timer of duration $D=(4*E^2-2*E*T)/T$ will give sufficient time for LED flashes to sweep through the exposures and provide guarantee that a valid maximum average intensity value will be captured. If the gap between exposures is not the same duration as the exposure times then the period between subsequent exposures is used instead of (2*E) in the equation above.

In operation 708, the data processor 202 receives the signal corresponding to an LED flash at the port 308 and timestamps the signal's arrival. At operation 710, the camera 208 captures an image including at least part of the LED flash. The captured image includes a timestamp generated by the camera 208.

If the data processor 202 determines that the timer has not expired in operation 712, the flowchart 700 returns to operation 708 for the further capture of the arrival of a signal corresponding to the next (e.g., subsequent) LED flash, and the method continues from there. Operation 708 and operation 710 are not sequential, but run in parallel.

When timer expiry is determined in operation 712, the data processor 202 determines the average intensity of each of the captured images in operation 714. This can be done, for example, by averaging the intensity values of the pixels making up each image. In operation 716 the data processor 202 determines the captured image with the maximum average intensity. This can be done for example by sorting the average image intensities from large to small.

In operation 718, the data processor 202 subtracts the timestamp of the image with the maximum average intensity from the arrival timestamp of the corresponding LED flash. The resulting timestamp offset is output in operation 720. In some examples, the data processor 202 corrects the timestamping performed by the camera in operation 722 by subtracting the timestamp offset determined in operation 720 from the relevant timestamp parameters and algorithms used for camera timestamping.

Figure 8:
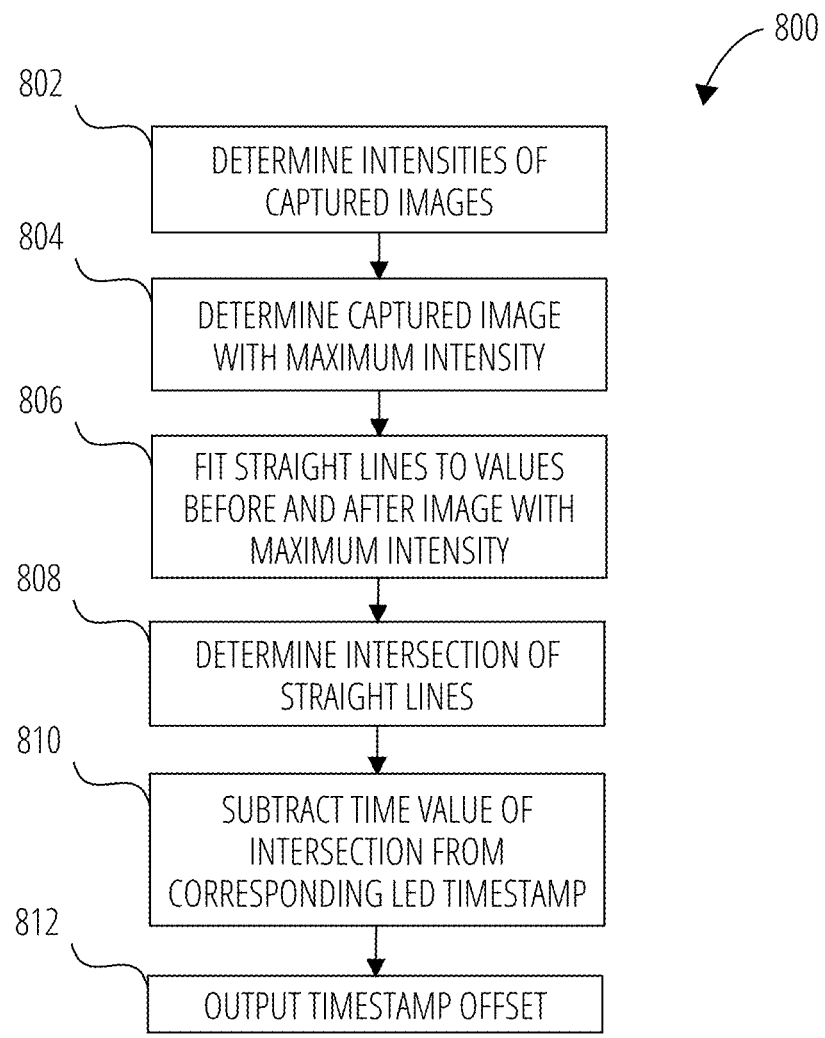
FIG. 8 is a flowchart illustrating a method of determining an error or offset in a camera timestamp, according to some examples.

FIG. 8 is a flowchart 800 illustrating alternative steps for determining an error or offset in a camera timestamp. Flowchart 800 commences at operation 802, which corresponds to operation 714 of FIG. 7.

As explained with respect to operation 714 of FIG. 7, the data processor 202 determines the average intensities of the captured images in operation 802. This can be done, for example, by averaging the intensity values of the pixels making up each image. In operation 804 the capture image with the maximum average intensity is determined. In operation 806, straight lines are fitted to the average intensity and timestamp values on either side of the image having the maximum average intensity.

In operation 808, the intersection of the lines determined in 806 is determined. In operation 810, the time value corresponding to the value of the intersection operation 808 is subtracted from the arrival timestamp of the corresponding LED flash.

The resulting timestamp offset is output in operation 812. In some examples, the data processor 202 corrects the timestamping performed by the camera in operation 722, by subtracting the timestamp offset determined in operation 810 from the relevant timestamp parameters and algorithms used for camera timestamping.

Figure 9:
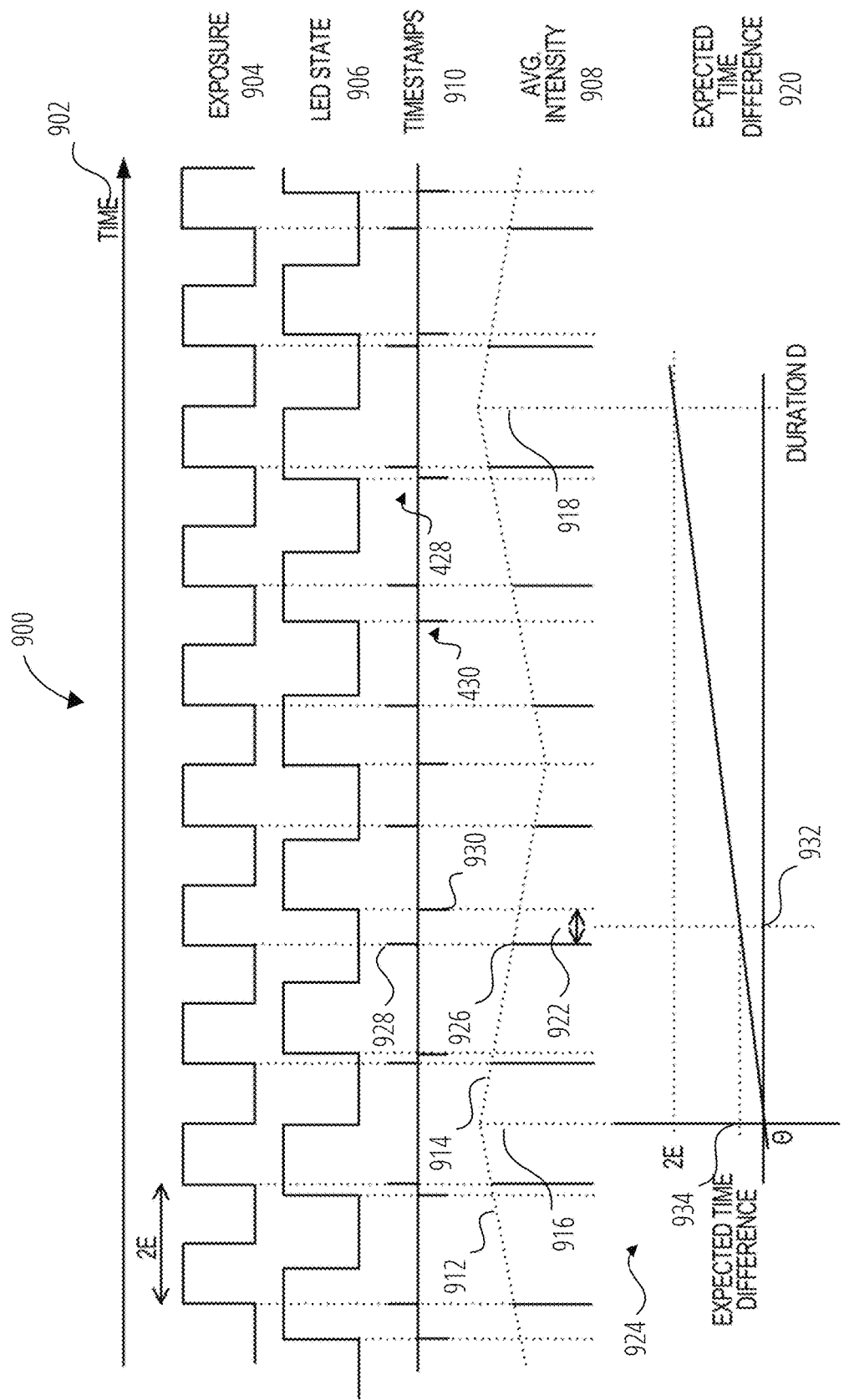
FIG. 9 is a chart illustrating an alternative method of determining a camera timestamp offset, according to some examples.

FIG. 9 is a chart 900 illustrating an alternative method of determining a camera timestamp offset, according to some examples. The chart shows the passage of time 902 from left to right in the figure, and the associated exposures 904, LED states 906, timestamps 910 (comprising camera timestamps 428 and GPIO timestamps 430), and average intensities 908. Also shown in FIG. 9 is a plot 924 of the expected time difference between the GPIO timestamps 430 and the camera timestamps 428 as a function of time.

The difference in the duration between the LED flashes and the exposures has been exaggerated in chart 900, to illustrate that there may not be a perfect overlap between a single LED flash and a single exposure, and thus that there will not be a perfect maximum average intensity, as discussed above with reference to FIG. 6. As in FIG. 6, lines line 912 and 914 have been fitted to the increasing and decreasing average intensities 908 to determine the timestamp of a theoretical exposure with calculated greatest average intensity 916.

As can be seen, after the first calculated greatest average intensity 916, the gap between the camera timestamps 428 and GPIO timestamps 430 gradually gets bigger and bigger until the next peak in intensity, by which time the GPIO timestamps 430 have fallen one full frame period (e.g., 2*E) behind the camera timestamps 428.

Plot 924 shows the expected offset between camera timestamps 428 and GPIO timestamps 430 based on the fact that if the expected offset is zero at the first calculated greatest average intensity 916, and then it should be the frame period (2*E) at the second calculated greatest average intensity 918.

The expected offset can then be compared with the measured offset for each set of measured GPIO timestamps 430 and camera timestamps 428. For example, for a particular camera timestamp 928 and associated LED timestamp 930, a measured time difference 922 can be determined by subtracting the value of LED timestamp 930 from the value of camera timestamp 928. The midpoint 932 of these two values can then be used in plot 924 to determine an expected time difference 934. If the measured time difference 922 and the expected time difference 934 are identical then there is no error in the camera timestamps 428. If these values are not identical, then the one variable with an anticipated error is the camera timestamp 928, therefore the camera timestamp 928 must be wrong by the difference between the measured time difference 922 and the expected time difference 934.

The determination in the error or offset in the camera timestamp as the difference between the measured time difference and the expected time difference can be determined for every LED flash between the two peaks (such as calculated greatest average intensity 916 and calculated greatest average intensity 918) and averaged to determine a more accurate camera timestamp offset value. Additional processing may be done to the values obtained, for example outlier elimination. The sign of the error or offset will depend on the particular circumstances, for example whether the camera exposure time is longer or shorter than the LED flash period.

Figure 10:
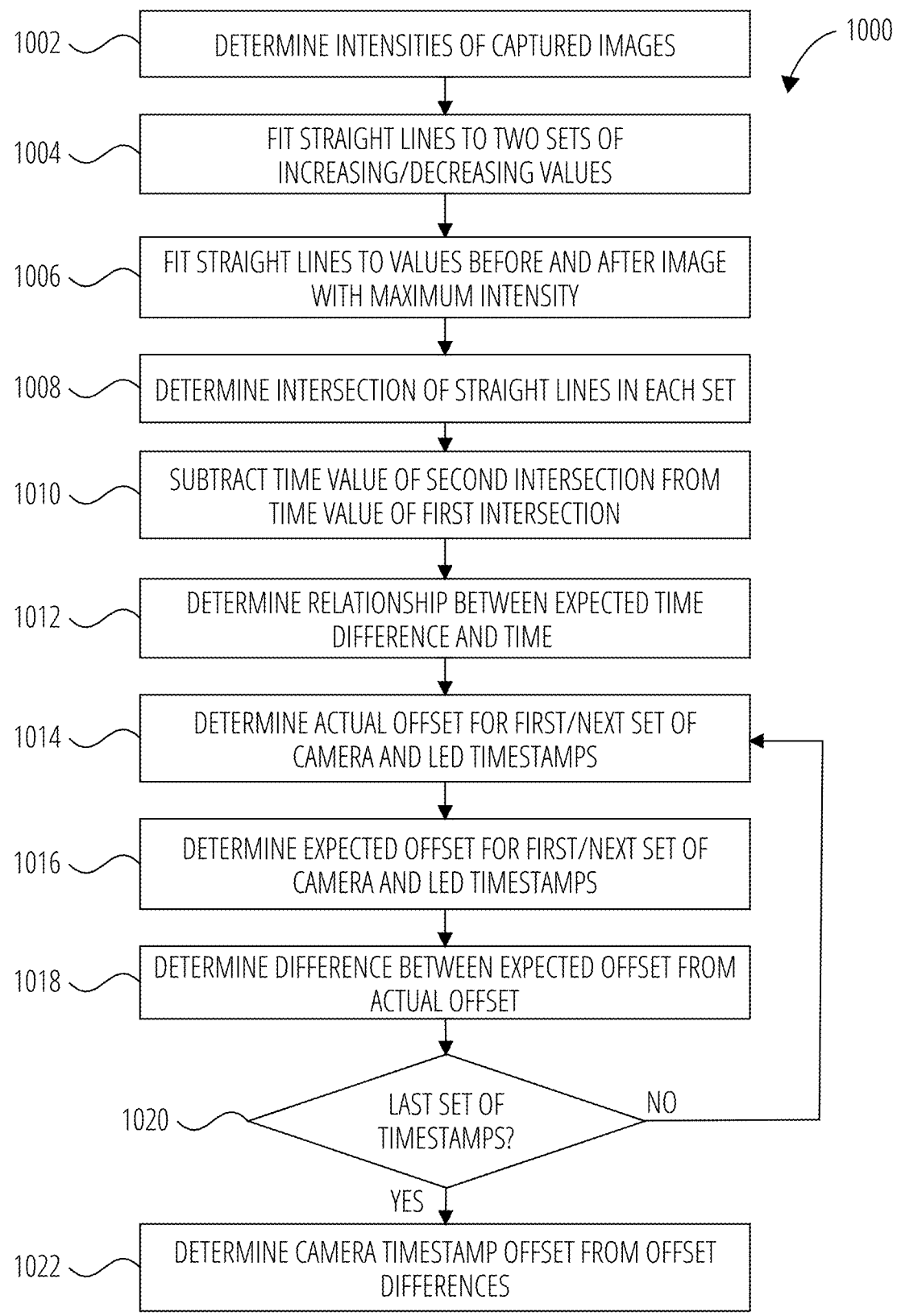
FIG. 10 is a flowchart illustrating a method of determining an error or offset in a camera timestamp, according to some examples.

FIG. 10 is a flowchart 1000 illustrating alternative steps for determining an error or offset in a camera timestamp. For explanatory purposes, the operations of the flowchart 1000 are described herein as occurring in serial, or linearly. However, multiple operations of the flowchart 1000 may occur in parallel. In addition, the operations of the flowchart 1000 need not be performed in the order shown and/or one or more blocks of the flowchart 1000 need not be performed and/or can be replaced by other operations.

Flowchart 1000 commences at operation 1002, which corresponds to operation 714 of FIG. 7. The steps in flowchart 1000 are performed by a data processor, such as the data processor 202, and may also be embodied in a non-transitory computer readable medium.

As explained with respect to operation 714 of FIG. 7, the data processor 202 determines the average intensities of the captured images in operation 1002. This can be done, for example, by averaging the intensity values of the pixels making up each image.

In operation 1004, straight lines are fitted to two consecutive sets of increasing and decreasing intensity values. Referring to FIG. 8 for example, the first set of increasing and decreasing intensity values are respectively before and after calculated greatest average intensity 916 (which is yet to be determined) and the resulting fitted lines are line 912 and line 914. The second (and consecutive) set of increasing and decreasing values are on either side of calculated greatest average intensity 918 (which is also yet to be determined).

In operation 1008, the intersection of the lines fitted from the first set of intensity values is determined to identify a time value of a first calculated greatest average intensity (such as 916 in FIG. 9), and the intersection of the lines fitted from the second set of intensity values is determined to identify a time value of a second calculated greatest average intensity (such as 918 in FIG. 9).

The time value of the second calculated greatest average intensity is subtracted from the time value of the first calculated greatest average intensity, to determine a period over which the average intensity values cycle between two maximum values, in operation 1010. A straight line relationship between expected time difference and time is then determined, using an expected value of the time difference of zero at the first calculated greatest average intensity at the beginning of the period, and a value of the camera exposure frame period (the inverse of the exposure frame rate) at the second calculated greatest average intensity at the end of the period, in operation 1012.

In operation 1014, the actual offset between the first camera timestamp and the first LED timestamp after the first calculated greatest average intensity is determined. In subsequent loops, this will be the next camera timestamp and the next LED timestamp in a direction away from the first calculated greatest average intensity.

In operation 1016 the expected offset is determined for first/next set of camera and LED timestamps, using the relationship determined in operation 1012 and a time value for the relevant set of camera and LED timestamps, such as the average of the two timestamp values.

The difference between the expected offset determined in operation 1016 and the actual offset determined in operation 1014 is then determined in operation 1018. In operation 1020 it is determined whether the set of camera and LED timestamps is the last set before the second calculated greatest average intensity. If not, the method returns to operation 1014 and proceeds from there.

If it is the last set, the method proceeds to operation 1022 where the camera timestamp offset is determined using the differences determined in operation 1018. In some examples, the camera timestamp offset is determined as an average of the differences determined in operation 1018.

The resulting timestamp offset is then output. In some examples, the data processor 202 corrects the timestamping performed by the camera, by subtracting the timestamp offset determined in operation 1022 from the relevant timestamp parameters and/or algorithms used for camera timestamping.

Figure 11:
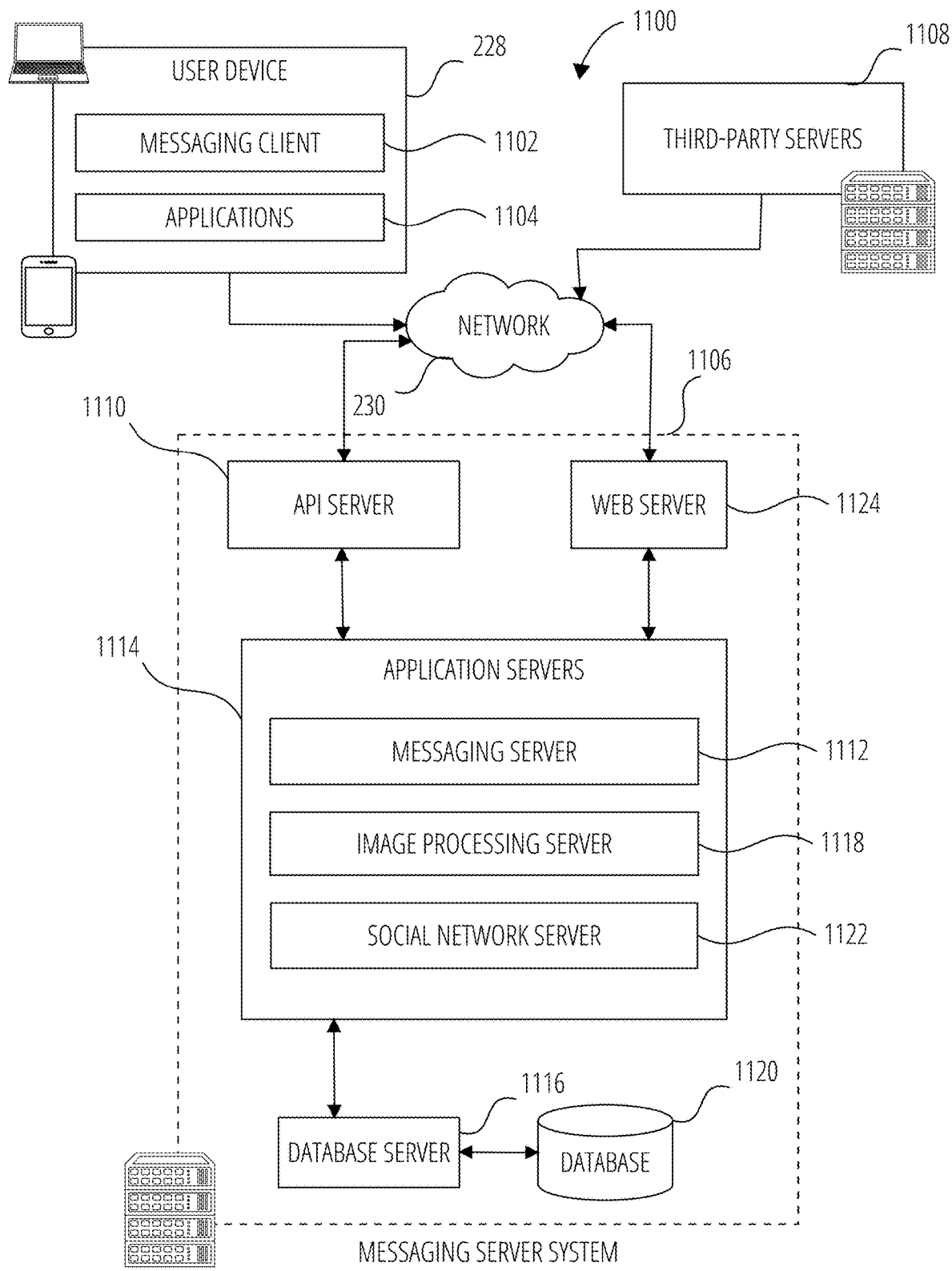
FIG. 11 is a diagrammatic representation of a networked environment in which the present disclosure may be deployed, in accordance with some examples.

FIG. 11 is a block diagram showing an example messaging system 1100 for exchanging data (e.g., messages and associated content) over a network. The messaging system 1100 includes multiple instances of a user device 228 which host a number of Applications, including a messaging client 1102 and other applications 1104. A messaging client 1102 is communicatively coupled to other instances of the messaging client 1102 (e.g., hosted on respective other user devices 228), a messaging server system 1106 and third-party servers 1108 via a network 230 (e.g., the Internet). A messaging client 1102 can also communicate with locally-hosted Applications 1104 using Application Program Interfaces (APIs).

A messaging client 1102 is able to communicate and exchange data with other messaging clients 1102 and with the messaging server system 1106 via the network 230. The data exchanged between messaging clients 1102, and between a messaging client 1102 and the messaging server system 1106, includes functions (e.g., commands to invoke functions) as well as payload data (e.g., text, audio, video or other multimedia data).

The messaging server system 1106 provides server-side functionality via the network 230 to a particular messaging client 1102. While some functions of the messaging system 1100 are described herein as being performed by either a messaging client 1102 or by the messaging server system 1106, the location of some functionality either within the messaging client 1102 or the messaging server system 1106 may be a design choice. For example, it may be technically preferable to initially deploy some technology and functionality within the messaging server system 1106 but to later migrate this technology and functionality to the messaging client 1102 where a user device 228 has sufficient processing capacity.

The messaging server system 1106 supports various services and operations that are provided to the messaging client 1102. Such operations include transmitting data to, receiving data from, and processing data generated by the messaging client 1102. This data may include message content, user device information, geolocation information, media augmentation and overlays, message content persistence conditions, social network information, and live event information, as examples. Data exchanges within the messaging system 1100 are invoked and controlled through functions available via user interfaces (UIs) of the messaging client 1102.

Turning now specifically to the messaging server system 1106, an Application Program Interface (API) server 1110 is coupled to, and provides a programmatic interface to, application servers 1114. The application servers 1114 are communicatively coupled to a database server 1116, which facilitates access to a database 1120 that stores data associated with messages processed by the application servers 1114. Similarly, a web server 1124 is coupled to the application servers 1114, and provides web-based interfaces to the application servers 1114. To this end, the web server 1124 processes incoming network requests over the Hypertext Transfer Protocol (HTTP) and several other related protocols.

The Application Program Interface (API) server 1110 receives and transmits message data (e.g., commands and message payloads) between the user device 228 and the application servers 1114. Specifically, the Application Program Interface (API) server 1110 provides a set of interfaces (e.g., routines and protocols) that can be called or queried by the messaging client 1102 in order to invoke functionality of the application servers 1114. The Application Program Interface (API) server 1110 exposes various functions supported by the application servers 1114, including account registration, login functionality, the sending of messages, via the application servers 1114, from a particular messaging client 1102 to another messaging client 1102, the sending of media files (e.g., images or video) from a messaging client 1102 to a messaging server 1112, and for possible access by another messaging client 1102, the settings of a collection of media data (e.g., story), the retrieval of a list of friends of a user of a user device 228, the retrieval of such collections, the retrieval of messages and content, the addition and deletion of entities (e.g., friends) to an entity graph (e.g., a social graph), the location of friends within a social graph, and opening an application event (e.g., relating to the messaging client 1102).

The application servers 1114 host a number of server Applications and subsystems, including for example a messaging server 1112, an image processing server 1118, and a social network server 1122. The messaging server 1112 implements a number of message processing technologies and functions, particularly related to the aggregation and other processing of content (e.g., textual and multimedia content) included in messages received from multiple instances of the messaging client 1102. As will be described in further detail, the text and media content from multiple sources may be aggregated into collections of content (e.g., called stories or galleries). These collections are then made available to the messaging client 1102. Other processor and memory intensive processing of data may also be performed server-side by the messaging server 1112, in view of the hardware requirements for such processing.

The application servers 1114 also include an image processing server 1118 that is dedicated to performing various image processing operations, typically with respect to images or video within the payload of a message sent from or received at the messaging server 1112.

The social network server 1122 supports various social networking functions and services and makes these functions and services available to the messaging server 1112. To this end, the social network server 1122 maintains and accesses an entity graph within the database 1120. Examples of functions and services supported by the social network server 1122 include the identification of other users of the messaging system 1100 with which a particular user has relationships or is "following," and also the identification of other entities and interests of a particular user.

The messaging client 1102 can notify a user of the user device 228, or other users related to such a user (e.g., "friends"), of activity taking place in shared or shareable sessions. For example, the messaging client 1102 can provide participants in a conversation (e.g., a chat session) in the messaging client 1102 with notifications relating to the current or recent use of a game by one or more members of a group of users. One or more users can be invited to join in an active session or to launch a new session. In some examples, shared sessions can provide a shared augmented reality experience in which multiple people can collaborate or participate.

Figure 12:
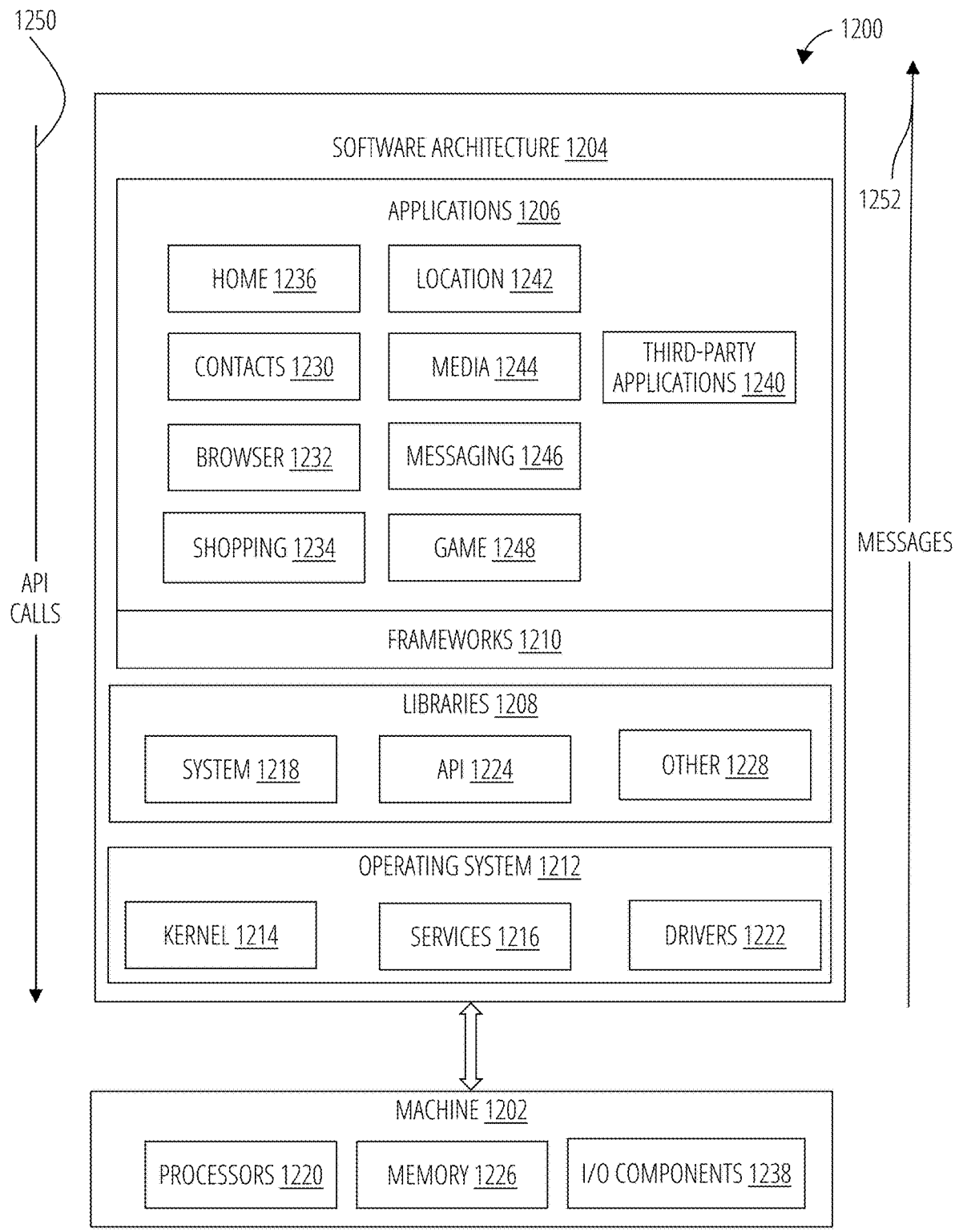
FIG. 12 is a block diagram showing a software architecture within which the present disclosure may be implemented, in accordance with some examples.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where individual layers provides a particular functionality. The software architecture 1204 includes layers such as an operating system 1212, libraries 1208, frameworks 1210, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionalities. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1208 provide a low-level common infrastructure used by the applications 1206. The libraries 1208 can include system libraries 1218 (e.g., C standard library) that provide functions such as memory allocation functions, string manipulation functions, mathematic functions, and the like. In addition, the libraries 1208 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) graphic content on a display, GLMotif used to implement 3D user interfaces), image feature extraction libraries (e.g. OpenIMAJ), database libraries (e.g., SQLite to provide various relational database functions), web libraries (e.g., WebKit to provide web browsing functionality), and the like. The libraries 1208 can also include a wide variety of other libraries 1228 to provide many other APIs to the applications 1206.

The frameworks 1210 provide a high-level common infrastructure that is used by the applications 1206. For example, the frameworks 1210 provide various graphical user interface (GUI) functions, high-level resource management, and high-level location services. The frameworks 1210 can provide a broad spectrum of other APIs that can be used by the applications 1206, some of which may be specific to a particular operating system or platform.

In an example, the applications 1206 may include a home application 1236, a contacts application 1230, a browser application 1232, a shopping application 1234, a location application 1242, a media application 1244, a messaging application 1246, a game application 1248, and a broad assortment of other Applications such as third-party applications 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the third-party applications 1240 (e.g., Applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 1240 can invoke the API calls 1250 provided by the operating system 1212 to facilitate functionality described herein.

Figure 13:
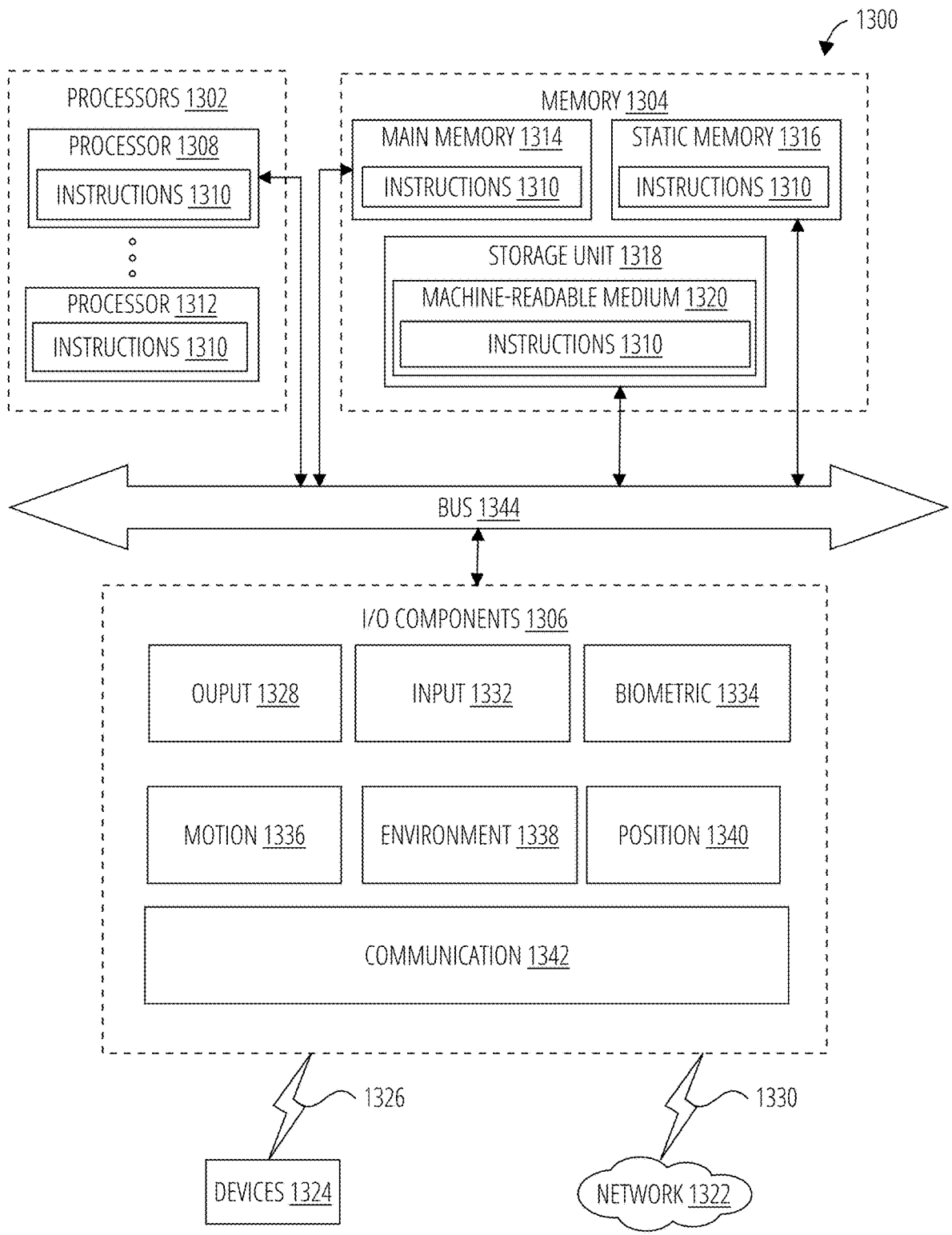
FIG. 13 is a diagrammatic representation of a machine, in the form of a computer system within which a set of instructions may be executed for causing the machine to perform any one or more of the methodologies discussed herein in accordance with some examples.

FIG. 13 is a diagrammatic representation of a machine 1300 within which instructions 1310 (e.g., software, a program, an application, an applet, an app, or other executable code) for causing the machine 1300 to perform any one or more of the methodologies discussed herein may be executed. For example, the instructions 1310 may cause the machine 1300 to execute any one or more of the methods described herein. The instructions 1310 transform the general, non-programmed machine 1300 into a particular machine 1300 programmed to carry out the described and illustrated functions in the manner described. The machine 1300 may operate as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a head-worn device (e.g., a smart watch), a smart home device (e.g., a smart appliance), other smart devices, a web appliance, a network router, a network switch, a network bridge, or any machine capable of executing the instructions 1310, sequentially or otherwise, that specify actions to be taken by the machine 1300. Further, while a single machine 1300 is illustrated, the term "machine" may also be taken to include a collection of machines that individually or jointly execute the instructions 1310 to perform any one or more of the methodologies discussed herein.

The machine 1300 may include processors 1302, memory 1304, and I/O components 1306, which may be configured to communicate with one another via a bus 1344. In an example, the processors 1302 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1308 and a processor 1312 that execute the instructions 1310. The term "processor" is intended to include multi-core processors that may comprise two or more independent processors (sometimes referred to as "cores") that may execute instructions contemporaneously. Although FIG. 13 shows multiple processors 1302, the machine 1300 may include a single processor with a single core, a single processor with multiple cores (e.g., a multi-core processor), multiple processors with a single core, multiple processors with multiples cores, or any combination thereof.

The memory 1304 includes a main memory 1314, a static memory 1316, and a storage unit 1318, both accessible to the processors 1302 via the bus 1344. The main memory 1304, the static memory 1316, and storage unit 1318 store the instructions 1310 embodying any one or more of the methodologies or functions described herein. The instructions 1310 may also reside, completely or partially, within the main memory 1314, within the static memory 1316, within machine-readable medium 1320 within the storage unit 1318, within one or more of the processors 1302 (e.g., within the processor's cache memory), or any suitable combination thereof, during execution thereof by the networked system 200.

The I/O components 1306 may include a wide variety of components to receive input, provide output, produce output, transmit information, exchange information, capture measurements, and so on. The specific I/O components 1306 that are included in a particular machine will depend on the type of machine. For example, portable machines such as mobile phones may include a touch input device or other such input mechanisms, while a headless server machine will likely not include such a touch input device. It will be appreciated that the I/O components 1306 may include many other components that are not shown in FIG. 13. In various examples, the I/O components 1306 may include output components 1328 and input components 1332. The output components 1328 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1332 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 1306 may include biometric components 1334, motion components 1336, environmental components 1338, or position components 1340, among a wide array of other components. For example, the biometric components 1334 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1336 include acceleration sensor components (e.g., accelerometer), gravitation sensor components, rotation sensor components (e.g., gyroscope), and so forth. The environmental components 1338 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1340 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1306 further include communication components 1342 operable to couple the networked system 200 to a network 1322 or devices 1324 via a coupling 1330 and a coupling 1326, respectively. For example, the communication components 1342 may include a network interface component or another suitable device to interface with the network 1322. In further examples, the communication components 1342 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1324 may be another machine or any of a wide variety of peripheral devices (e.g., a peripheral device coupled via a USB).

Moreover, the communication components 1342 may detect identifiers or include components operable to detect identifiers. For example, the communication components 1342 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1342, such as location via Internet Protocol (IP) geolocation, location via Wi-Fi® signal triangulation, location via detecting an NFC beacon signal that may indicate a particular location, and so forth.

The various memories (e.g., memory 1304, main memory 1314, static memory 1316, and/or memory of the processors 1302) and/or storage unit 1318 may store one or more sets of instructions and data structures (e.g., software) embodying or used by any one or more of the methodologies or functions described herein. These instructions (e.g., the instructions 1310), when executed by processors 1302, cause various operations to implement the disclosed examples.

The instructions 1310 may be transmitted or received over the network 1322, using a transmission medium, via a network interface device (e.g., a network interface component included in the communication components 1342) and using any one of a number of well-known transfer protocols (e.g., hypertext transfer protocol (HTTP)). Similarly, the instructions 1310 may be transmitted or received using a transmission medium via the coupling 1326 (e.g., a peer-to-peer coupling) to the devices 1324.

A "carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

A "user device" or "client device" refers to any machine that interfaces to a communications network to obtain resources from one or more server systems or other user or client devices. A user or client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing some operations and may be configured or arranged in a particular physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform some operations as described herein. A hardware component may also be implemented mechanically, electronically, or any suitable combination thereof. For example, a hardware component may include dedicated circuitry or logic that is permanently configured to perform some operations. A hardware component may be a special-purpose processor, such as a field-programmable gate array (FPGA) or an Application Specific Integrated Circuit (ASIC). A hardware component may also include programmable logic or circuitry that is temporarily configured by software to perform some operations. For example, a hardware component may include software executed by a general-purpose processor or other programmable processor. Once configured by such software, hardware components become specific machines (or specific components of a machine) tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") is to be understood to encompass a tangible entity, be that an entity that is physically constructed, permanently configured (e.g., hardwired), or temporarily configured (e.g., programmed) to operate in a particular manner or to perform some operations described herein. Considering examples in which hardware components are temporarily configured (e.g., programmed), the hardware components may not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be partially processor-implemented, with a particular processor or processors being an example of hardware. For example, some of the operations of a method may be performed by one or more processors or processor-implemented components. Moreover, the one or more processors may also operate to support performance of the relevant operations in a "cloud computing" environment or as a "software as a service" (SaaS). For example, at some of the operations may be performed by a group of computers (as examples of machines including processors), with these operations being accessible via a network (e.g., the Internet) and via one or more appropriate interfaces (e.g., an API). The performance of some of the operations may be distributed among the processors, residing within a single machine as well as being deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

A "computer-readable medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

A "machine-storage medium" refers to a single or multiple storage devices and/or media (e.g., a centralized or distributed database, and/or associated caches and servers) that store executable instructions, routines and/or data. The term includes, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at some of which are covered under the term "signal medium."

A "processor" refers to any circuit or virtual circuit (a physical circuit emulated by logic executing on an actual processor) that manipulates data values according to control signals (e.g., "commands", "op codes", "machine code", and so forth) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" may be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

A "carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

A "user device" or "client device" refers to any machine that interfaces to a communications network to obtain resources from one or more server systems or other user or client devices. A user or client device may be, but is not limited to, a mobile phone, desktop computer, laptop, portable digital assistants (PDAs), smartphones, tablets, ultra-books, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing some operations and may be configured or arranged in a particular physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform some operations as described herein. A hardware component may also be implemented mechanically, electronically, or any suitable combination thereof. For example, a hardware component may include dedicated circuitry or logic that is permanently configured to perform some operations. A hardware component may be a special-purpose processor, such as a field-programmable gate array (FPGA) or an Application Specific Integrated Circuit (ASIC). A hardware component may also include programmable logic or circuitry that is temporarily configured by software to perform some operations. For example, a hardware component may include software executed by a general-purpose processor or other programmable processor. Once configured by such software, hardware components become specific machines (or specific components of a machine) tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") is to be understood to encompass a tangible entity, be that an entity that is physically constructed, permanently configured (e.g., hardwired), or temporarily configured (e.g., programmed) to operate in a particular manner or to perform some operations described herein. Considering examples in which hardware components are temporarily configured (e.g., programmed), the hardware components may not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be partially processor-implemented, with a particular processor or processors being an example of hardware. For example, some of the operations of a method may be performed by one or more processors or processor-implemented components. Moreover, the one or more processors may also operate to support performance of the relevant operations in a "cloud computing" environment or as a "software as a service" (SaaS). For example, at some of the operations may be performed by a group of computers (as examples of machines including processors), with these operations being accessible via a network (e.g., the Internet) and via one or more appropriate interfaces (e.g., an API). The performance of some of the operations may be distributed among the processors, residing within a single machine as well as being deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

A "computer-readable medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

A "machine-storage medium" refers to a single or multiple storage devices and/or media (e.g., a centralized or distributed database, and/or associated caches and servers) that store executable instructions, routines and/or data. The term includes, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at some of which are covered under the term "signal medium."

A "processor" refers to any circuit or virtual circuit (a physical circuit emulated by logic executing on an actual processor) that manipulates data values according to control signals (e.g., "commands", "op codes", "machine code", and so forth) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" may be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A computer-implemented method of determining an image capture timestamp offset, the method comprising:
    generating a plurality of optical flashes at an optical flash rate;
    capturing a set of images of the plurality of optical flashes at an image capture rate, the image capture rate being different from the optical flash rate, and each image of an optical flash including an associated image timestamp;
    timestamping signals associated with generation of the plurality of optical flashes;
    determining an intensity of each image in the set of images;
    determining an image having the greatest intensity in the set of images; and
    determining a difference between a timestamp of the image having the greatest intensity and the timestamp of a corresponding optical flash to generate an image capture timestamp offset.

2. The computer-implemented method of claim 1, wherein an optical flash duration is approximately equal to an image exposure duration.

3. The computer-implemented method of claim 1, further comprising:
    determining a first line from the intensities and timestamps of images in the set of images that precede the image having the greatest intensity in the set of images;
    determining a second line from the intensities and timestamps of images in the set of images that follow the image having the greatest intensity in the set of images;
    determining an intersection of the first line and the second line; and
    using a time value of the intersection of the first line and the second line as the timestamp of an image having the greatest intensity in the determination of the difference between the timestamp of the image having the greatest intensity and the timestamp of the corresponding optical flash.

4. The computer-implemented method of claim 1, further comprising:
    adjusting a camera timestamping parameter based on the image capture timestamp offset.

5. The computer-implemented method of claim 1 wherein the signals associated with generation of the optical flashes are received at a port of a computer processor associated with a camera that captures the set of images of the optical flashes, the computer processor timestamping the receipt of the signals associated with generation of the optical flashes.

6. The computer-implemented method of claim 1, further comprising:
    setting a timer having a duration that is sufficient to ensure capture of an image having a maximum intensity; and
    capturing the set of images of the optical flashes for the duration of the timer.

7. The computer-implemented method of claim 1, wherein the image intensity of each image is an average image intensity.

8. A non-transitory computer-readable storage medium, the computer-readable storage medium including instructions that when executed by a computer, cause the computer to perform operations for determining an image capture timestamp offset from optical flashes generated at an optical flash rate, the operations comprising:
    generating a plurality of optical flashes at an optical flash rate;
    capturing a set of images of the plurality of optical flashes at an image capture rate, the image capture rate being different from the optical flash rate, and each image of an optical flash including an associated image timestamp;
    timestamping signals associated with generation of the plurality of optical flashes;
    determining an intensity of each image in the set of images;
    determining an image having the greatest intensity in the set of images; and
    determining a difference between a timestamp of the image having the greatest intensity and the timestamp of a corresponding optical flash to generate an image capture timestamp offset.

9. The non-transitory computer-readable storage medium of claim 8, wherein an optical flash duration is approximately equal to an image exposure duration.

10. The non-transitory computer-readable storage medium of claim 8, wherein the operations further comprise:
    determining a first line from the intensities and timestamps of images in the set of images that precede the image having the greatest intensity in the set of images;
    determining a second line from the intensities and timestamps of images in the set of images that follow the image having the greatest intensity in the set of images;

determining an intersection of the first line and the second line; and using a time value of the intersection of the first line and the second line as the timestamp of an image having the greatest intensity in the determination of the difference between the timestamp of the image having the greatest intensity and the timestamp of the corresponding optical flash.

11. The non-transitory computer-readable storage medium of claim 8, wherein the operations further comprise:
adjusting a camera timestamping parameter based on the image capture timestamp offset.

12. The non-transitory computer-readable storage medium of claim 8, wherein the signals associated with generation of the optical flashes are received at a port of a computer processor associated with a camera that captures the set of images of the optical flashes, the computer processor timestamping the receipt of the signals associated with generation of the optical flashes.

13. The non-transitory computer-readable storage medium of claim 8, wherein the image intensity of each image is an average image intensity.

14. The non-transitory computer-readable storage medium of claim 8, wherein the operations further comprise:
setting a timer having a duration that is sufficient to ensure capture of an image having a maximum intensity; and
capturing the set of images of the optical flashes for the duration of the timer.

15. A computing apparatus comprising:
a processor; and
a memory storing instructions that, when executed by the processor, configure the apparatus to perform operations for determining an image capture timestamp offset from optical flashes generated at an optical flash rate, comprising:
generating a plurality of optical flashes at an optical flash rate;
capturing a set of images of the plurality of optical flashes at an image capture rate, the image capture rate being different from the optical flash rate, and each image of an optical flash including an associated image timestamp;

timestamping signals associated with generation of the plurality of optical flashes;
determining an intensity of each image in the set of images;
determining an image having the greatest intensity in the set of images; and
determining a difference between a timestamp of the image having the greatest intensity and the timestamp of a corresponding optical flash to generate an image capture timestamp offset.

16. The computing apparatus of claim 15, wherein an optical flash duration is approximately equal to an image exposure duration.

17. The computing apparatus of claim 15, wherein the operations further comprise:
determining a first line from the intensities and timestamps of images in the set of images that precede the image having the greatest intensity in the set of images;
determining a second line from the intensities and timestamps of images in the set of images that follow the image having the greatest intensity in the set of images;
determining an intersection of the first line and the second line; and
using a time value of the intersection of the first line and the second line as the timestamp of an image having the greatest intensity in the determination of the difference between the timestamp of the image having the greatest intensity and the timestamp of the corresponding optical flash.

18. The computing apparatus of claim 15, wherein the operations further comprise:
adjusting a camera timestamping parameter based on the image capture timestamp offset.

19. The computing apparatus of claim 15, wherein the signals associated with generation of the optical flashes are received at a port of the processor, the processor timestamping the receipt of the signals associated with generation of the optical flashes.

20. The computing apparatus of claim 15, wherein the image intensity of each image is an average image intensity.

* * * * *